A. C. JOHNSON.
GEARING.
APPLICATION FILED APR. 13, 1914.

1,149,160.

Patented Aug. 3, 1915.
4 SHEETS—SHEET 1.

WITNESSES:
Charles Rekles
Thos Eastberg

INVENTOR
Alfred C. Johnson.
BY G. H. Strong
ATTORNEY

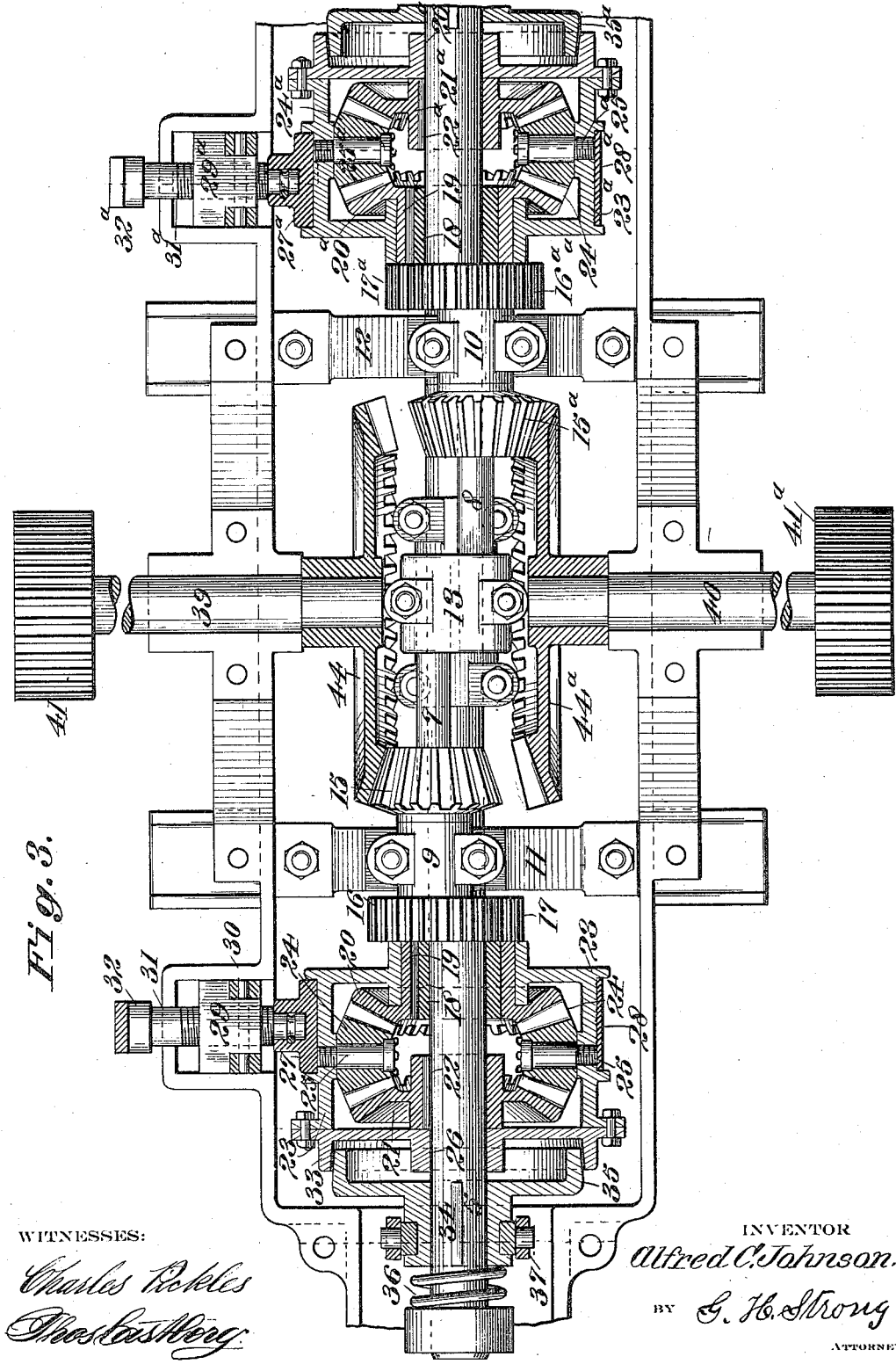

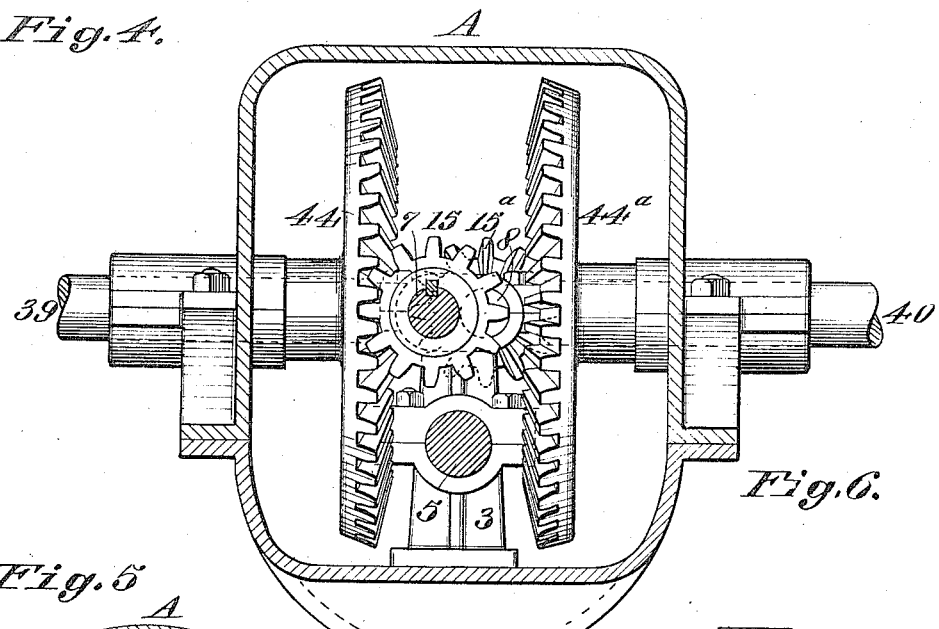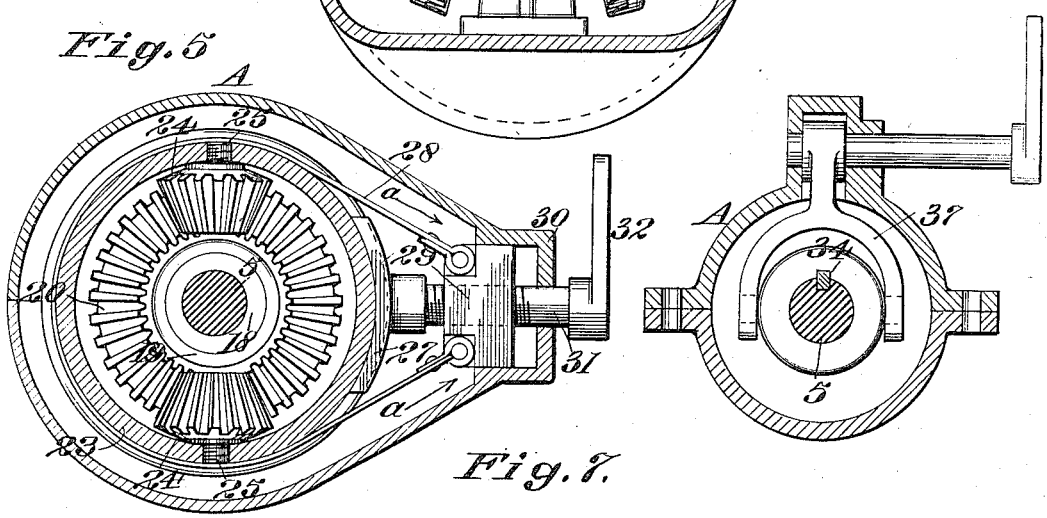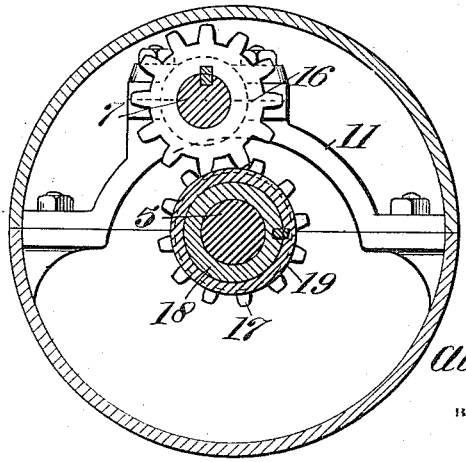

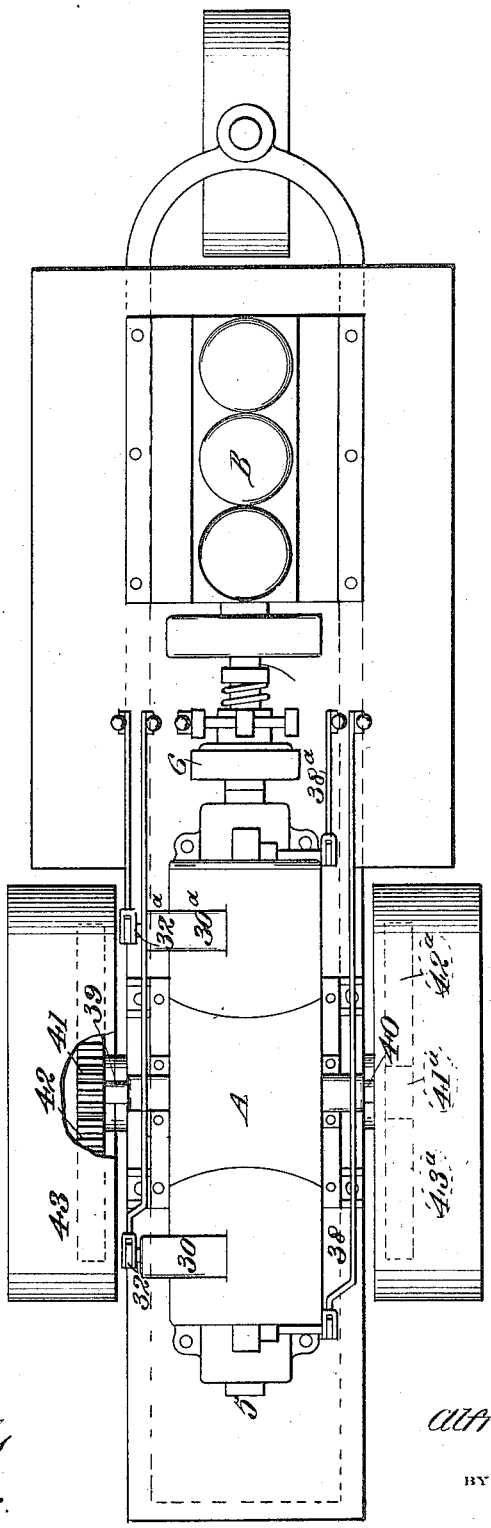

UNITED STATES PATENT OFFICE.

ALFRED C. JOHNSON, OF WINTERS, CALIFORNIA, ASSIGNOR TO WILLIAM J. BENSON, OF SAN JOSE, CALIFORNIA.

GEARING.

1,149,160.  Specification of Letters Patent.  Patented Aug. 3, 1915.

Application filed April 13, 1914. Serial No. 831,580.

*To all whom it may concern:*

Be it known that I, ALFRED C. JOHNSON, a citizen of the United States, residing at Winters, in the county of Yolo and State of California, have invented new and useful Improvements in Gearing, of which the following is a specification.

This invention relates to improvements in a transmission mechanism for traction engines or other motor vehicles.

The object of the invention is to provide a simple, compact, durable transmission mechanism which is so constructed that a drive may be transmitted in either direction to either wheel of a traction engine or other vehicle independently, and which also permits the wheels to be reversed together or driven ahead.

Another object of the invention is to provide a transmission mechanism of the character described which is so constructed that the gears may be extended and positioned to produce a narrow gear casing, thus permitting the construction of a narrow tread machine, or a narrow frame machine with wide treaded wheels.

Further objects will hereinafter appear.

The invention consists in the parts and the construction and combination of parts as hereinafter more fully described and claimed, having reference to the accompanying drawings in which—

Figure 1:
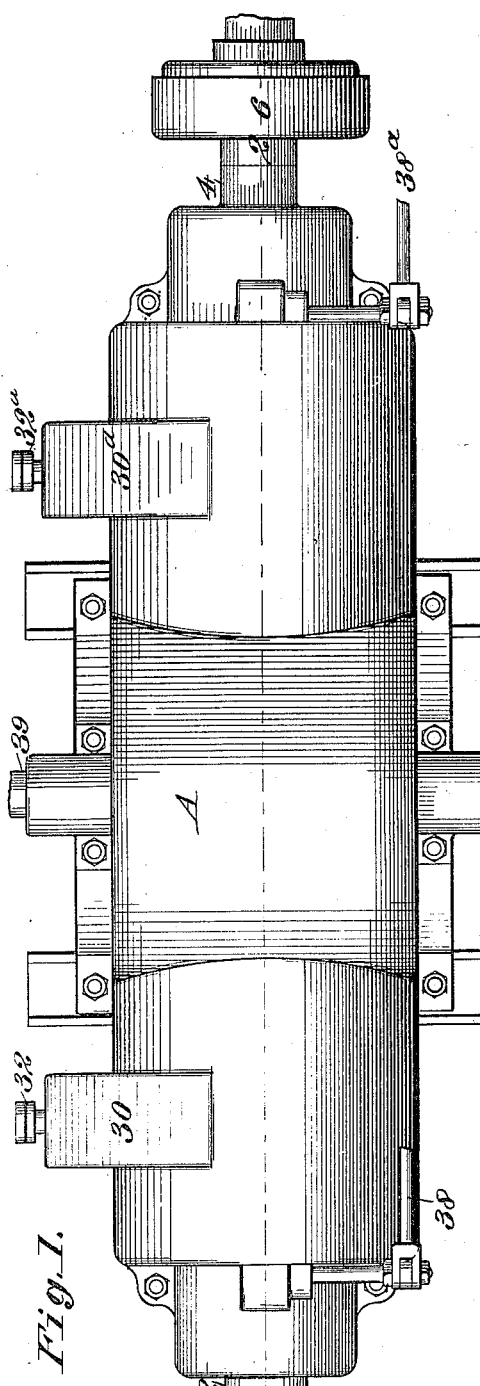
Figure 2:
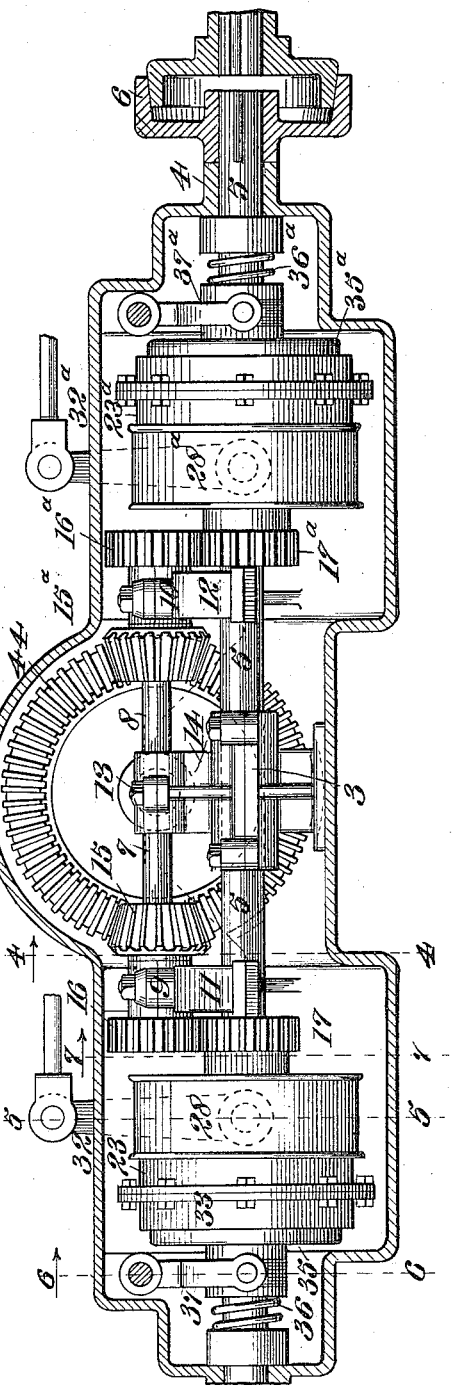

Figure 1 is a plan view of the gear casing. Fig. 2 is a vertical, longitudinal section through same on line 2—2, Fig. 1. Fig. 3 is a longitudinal plan section. Fig. 4 is a cross section on line 4—4, Fig. 2. Fig. 5 is a cross section on line 5—5, Fig. 2. Fig. 6 is a cross section on line 6—6, Fig. 2. Fig. 7 is a cross section on line 7—7, Fig. 2. Fig. 8 is a plan view of a traction engine, showing the application of the transmission mechanism.

Referring to the drawings, A indicates a casing in which is journaled as at 2, 3 and 4 a main drive or power shaft 5. This extends through the casing from end to end, and is connected with the engine B of the tractor through the engine clutch indicated at 6. Slightly elevated and offset with relation to the main drive shaft is a pair of intermediate shafts 7 and 8. These are journaled at their outer ends in bearings 9 and 10, which are mounted on the cross frames indicated at 11 and 12, and at their inner ends in bearing 13 carried by the standard indicated at 14. Keyed to shaft 7 on one side of the member 9 is a bevel pinion 15, and similarly secured to the shaft on the opposite side of bearing 9 is a spur gear 16. Intermeshing with said spur gear is a second spur gear 17, which is formed integrally with a sleeve 18, loosely mounted upon the main drive shaft 5. Surrounding said sleeve, and keyed to same is a second sleeve 19, and formed integrally with said sleeve, or otherwise secured to same, is a bevel pinion 20. Facing the bevel pinion indicated at 20 is a second bevel pinion 21 which is connected to the main drive shaft as at 22, and inclosing bevel pinions 20 and 21 is an annular casing 23 to which is secured a suitable number of intermediate pinions 24 which are so positioned as to intermesh with pinions 20 and 21. The intermediate pinions are free to revolve upon stud bolts 25, and the casing in which they are mounted is turnably mounted on the drive shaft, as indicated at 26 and on the outside of the sleeve indicated at 19. It is, however, possible to lock the annular casing against revolution through the means of shoe 27 and band 28, the ends of which are secured to a block 29, slidably mounted in an extension 30, formed on the side of the main casing. Shoe 27 is mounted on the outer end of an externally threaded bolt 21 which also passes through block 29, and the outer end of the bolt which extends through the casing, is provided with a lever 32 by which it may be turned. Movement of the lever in one direction or the other will either force the shoe in an inward direction and pull the ends of the brake band outwardly in the direction of arrows *a* to lock the casing against revolving movement, or the shoe will move away from the casing while the block to which the brake-band is secured moves inwardly, thus releasing the casing and permitting this to revolve.

One end of the casing is provided with an annular extension 33, on the interior surface of which is formed a clutch face, and slidably mounted on a feather 34 on the main drive shaft is a cone clutch 35, which is adapted to be thrown into engagement with the clutch extension 33 formed on the casing. Clutch 35 is normally thrown into engagement with the co-acting member 33 through the means of coil spring 36, and can only be thrown out of engagement with same by rocking a forked lever 37 through the link connection, indicated at 38. Movement from the main drive shaft 5 may be transmitted through clutch 35 and casing 23 to revolve spur gear 17, which is loosely mounted on the main drive shaft in the same direction, or movement may be transmitted from the main drive shaft 5 when the casing is locked against movement through the means of shoe 27 and brake band 28 through pinion 20 to which spur gear 17 is secured through means of sleeves 18 and 19 to revolve spur gear 17 in an opposite direction to that of the revolution of the main drive shaft. It can thus be seen that movement may be transmitted through the main driving shaft to spur gear 17 to drive this in unison with same, or in an opposite direction. Gears 16 and 15 being direct connected to same may consequently be reversed or driven ahead as the case may be. Intermeshing with pinion 15 is a bevel master gear 44 which is secured to one end of a divided driving shaft, indicated at 39 and 40. To the opposite end of shaft 39 is secured a spur gear 41, and intermeshing with said spur gear is an internal gear 42 which is suitably secured to the inner periphery or spokes of the tractor wheel, indicated at 43. From the following description it can easily be seen that the movement of the main drive shaft may be transmitted in either one direction or another through gear 17 with connected gears 15 and 16 which mesh with the bevel master gear 44. This will in turn transmit through shaft 39, spur pinion 41 and internal gear 42 with connected tractor wheel to revolve this in one direction or another.

Secured to shaft 8 is a pair of gears 15$^a$ and 16$^a$, and intermeshing with gear 16$^a$ is a spur gear 17$^a$ through which movement is transmitted from the main drive shaft through clutch 35$^a$, when a direct drive is desired, and through which a reverse movement may be transmitted through pinion 21$^a$ with connected intermediates 24$^a$ and pinion 20$^a$ which are controlled by the brake-band 28$^a$ and shoe in the manner previously described. The movement of pinion 15$^a$ is in turn transmitted through the master bevel indicated at 44$^a$, shaft 40, spur pinion 41$^a$ and connected internal gear to tractor wheel 43$^a$.

Referring to the drawings and the previous description of the mechanism it can be seen that movement may be transmitted from the main drive shaft to drive either one traction wheel or another in one direction or another, and that it also becomes possible to reverse the wheels together or to drive ahead. When a direct drive is transmitted to both wheels it is accomplished by releasing the brake-bands with connected shoes and throwing clutches 35 and 35$^a$ into engagement with the clutch extension on the respective casing. Movement will then be transmitted from the main drive shaft through casing 23$^a$ gear 17$^a$ with connected gears 15$^a$ and 16$^a$ which in turn are connected with the master bevel 44$^a$ and pinion 41$^a$ to drive the tractor wheel indicated at 43$^a$ ahead. Movement is similarly transmitted from the main drive shaft through clutch 35 and the casing 23$^a$ and gear 17 with connected gears 15 and 16 to master bevel 44 through which power in turn is transmitted through spur 41 to drive the tractor wheel indicated at 43 ahead. If it is desired to turn a sharp corner a head drive may be transmitted to one wheel while a reverse is transmitted to the opposite wheel, or if it is desired to back up it is accomplished by releasing clutches 35 and 35$^a$ and locking casings 23 and 23$^a$ against revolution through the medium of brake-bands 28 and 28$^a$. Movement is then transmitted through gears 21 and 21$^a$ through intermediates 24 and 24$^a$ to bevel pinions 20 and 20$^a$, which in turn transmit through the connected sleeves 18 and 19, and 18$^a$ and 19$^a$ and gears 17 and 17$^a$ to gears 16 and 15, and 16$^a$ and 15$^a$. The reverse movement of pinions 15 and 15$^a$ is transmitted through the respective master bevel gears with connected shafts and pinions to drive the tractor wheels in a reverse direction.

A transmission mechanism constructed as here shown is particularly adapted for traction engines which employ a narrow frame with wide tread traction wheels, or to a traction engine in which it is desirable to secure as narrow a tread as possible. The end for end arrangement of the reversing gears within the annular housings 23 and 23$^a$ permits a long, narrow transmission mechanism which is particularly adapted to the narrow tread or narrow frame machine. It is substantial and durable in construction and less liable to breakage than the transmission mechanisms now commonly used, as the gears are always intermeshing with each other and driven through friction clutches which permits the load to gradually take hold, thus relieving the individual teeth from shocks and strains which might produce breakage.

Having thus described my invention, what I claim and desire to secure by Letters Patent is:

1. A transmission mechanism comprising a power shaft, a driven shaft at right angles to the power shaft, a third shaft parallel to the power shaft, a gear on the power shaft, a gear on the driven shaft, a gear on the third shaft meshing with the gear on the driven shaft, a second gear on the third shaft meshing with the gear on the power shaft, and means for driving the gear on the power shaft, from the latter, in either direction.

2. A transmission mechanism comprising a power shaft, a driven shaft at right angles to the power shaft, an intermediate shaft, gears on the intermediate shaft, a gear on the power shaft meshing with one of the gears on the intermediate shaft, a gear on the driven shaft meshing with one of the gears on the intermediate shaft, and means carried in part by the power shaft for driving the gear on the latter in either direction from the power shaft.

3. A transmission mechanism comprising a casing, a power shaft, means for rotating the latter, a driven shaft at right angles to the power shaft, an intermediate shaft, a gear on the power shaft and driven thereby, a gear on the driven shaft, gears on the intermediate shaft meshing with gears on the power shaft and driven shaft, a second gear on the power shaft, and means carried by the casing and including an element meshing with said second gear on the power shaft for reversing the direction of the first gear on the latter.

4. A transmission mechanism comprising a casing, a power shaft extending longitudinally thereof, a driven shaft at right angles to the power shaft, an intermediate shaft parallel to the power shaft, means for connecting the intermediate shaft with the power shaft and the driven shaft, said means including a gear on the power shaft, and means for driving the gear on the power shaft in either direction from the latter.

5. A transmission mechanism comprising a casing, a power shaft extending longitudinally of the casing, a driven shaft at right angles to the power shaft, means for connecting the power shaft with the driven shaft and comprising a plurality of gears carried by a shaft extending parallel to the power shaft and a gear carried on the power shaft, means rotating with the power shaft to cause the gear thereon to rotate in one direction, and means carried by the casing to hold said means in part against rotation with the power shaft to cause the gear on the power shaft to rotate in the opposite direction.

6. In a transmission mechanism, spaced shafts, a gear fixed on each shaft, a loose gear on one shaft operatively connected to the gear of the other shaft, and a mechanism constantly connecting the loose gear to the fixed gear of the same shaft and including means for driving the driven of said shafts in either direction.

7. In a transmission mechanism, spaced shafts, a gear fixed on each shaft, a loose gear on one shaft operatively connected to the gear of the other shaft, a mechanism operatively connecting the loose gear to the fixed gear of the same shaft and including a casing turnably mounted on the last shaft and adapted when held against rotation to effect a reversal of movement of the driven of said shafts, and means for holding the casing against movement.

In testimony whereof I have hereunto set my hand in the presence of two subscribing witnesses.

ALFRED C. JOHNSON.

Witnesses:
L. A. COLLINGS,
T. W. ANDERSON.